US007787988B2

(12) United States Patent
Whitten et al.

(10) Patent No.: US 7,787,988 B2
(45) **Date of Patent: *Aug. 31, 2010**

(54) METHOD AND SYSTEM FOR ACCOMPLISHING PRODUCT DETECTION

(75) Inventors: David B. Whitten, Saint Charles, MO (US); William Edwin Booth, Saint Louis, MO (US); Paul Kevin Griner, Saint Louis, MO (US); Brian Lee Duncan, Highland, IL (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/982,330

(22) Filed: Oct. 31, 2007

(65) Prior Publication Data

US 2008/0128449 A1 Jun. 5, 2008

Related U.S. Application Data

(60) Continuation of application No. 11/977,099, filed on Oct. 23, 2007, which is a division of application No. 10/173,795, filed on Jun. 18, 2002, now Pat. No. 7,286,901, which is a continuation-in-part of application No. 09/935,935, filed on Aug. 23, 2001, now Pat. No. 6,732,014.

(60) Provisional application No. 60/271,998, filed on Feb. 27, 2001.

(51) Int. Cl.
*G06F 17/00* (2006.01)

(52) U.S. Cl. ........................ 700/244; 700/232; 700/243; 221/13; 221/9; 221/195; 221/2

(58) Field of Classification Search ......... 221/1–312 C, 221/13, 2, 9, 195; 700/231, 232, 236, 243, 700/244

See application file for complete search history.

(56) References Cited

U.S. PATENT DOCUMENTS

| | | | |
|---|---|---|---|
| 3,692,211 | A | 9/1972 | Flubacker |
| 3,746,863 | A | 7/1973 | Pronovost |
| 3,805,061 | A | 4/1974 | De Missimy et al. |
| 4,252,250 | A | 2/1981 | Toth |

(Continued)

FOREIGN PATENT DOCUMENTS

| | | | |
|---|---|---|---|
| DE | 43 38 978 | A1 | 5/1995 |

OTHER PUBLICATIONS

Communication pursuant to Article 94(3) EPC dated Feb. 8, 2008 in European Patent Application No. 02 744 414.0, 5 pages.

(Continued)

*Primary Examiner*—Gene Crawford
*Assistant Examiner*—Michael K Collins

(57) ABSTRACT

The present invention provides for a vending system wherein a monitoring system verifies that a product ordered by a vending customer is actually delivered through a delivery area to the customer. If the product ordered is unavailable either because of an out of stock situation or a blockage of the deliver path for that product, the present invention allows the customer to request a refund or order a second product. Additionally, the present invention helps to prevent theft of product from the vending system.

20 Claims, 6 Drawing Sheets

U.S. PATENT DOCUMENTS

| | | | | |
|---|---|---|---|---|
| 4,266,124 | A | 5/1981 | Weber et al. | |
| 4,512,453 | A | 4/1985 | Schuller et al. | |
| 4,608,679 | A | 8/1986 | Rudy et al. | |
| 4,854,477 | A * | 8/1989 | Kurosawa et al. | 221/1 |
| 5,076,801 | A | 12/1991 | Schroll | |
| 5,110,008 | A | 5/1992 | Moulding, Jr. et al. | |
| 5,149,921 | A | 9/1992 | Picado | |
| 5,303,844 | A | 4/1994 | Muehlberger | |
| 5,417,233 | A | 5/1995 | Thomas et al. | |
| 6,186,396 | B1 | 2/2001 | Crandall, Jr. | |
| 6,202,888 | B1 * | 3/2001 | Pollock et al. | 221/1 |
| 6,384,402 | B1 * | 5/2002 | Hair et al. | 250/223 R |
| 6,592,005 | B1 | 7/2003 | Coughlin et al. | |
| 6,629,625 | B1 | 10/2003 | Paczkowski et al. | |
| 6,732,014 | B2 | 5/2004 | Whitten et al. | |
| 6,772,906 | B2 | 8/2004 | Wittern, Jr. et al. | |
| 6,794,634 | B2 | 9/2004 | Hair et al. | |
| 7,191,034 | B2 | 3/2007 | Whitten et al. | |
| 7,286,901 | B2 * | 10/2007 | Whitten et al. | 700/244 |
| 2001/0000408 | A1 | 4/2001 | Hair et al. | |
| 2001/0020685 | A1 | 9/2001 | Serita | |

OTHER PUBLICATIONS

U.S. Office Action dated Aug. 27, 2008 in connection with U.S. Appl. No. 11/977,099.

Office Action dated Jan. 8, 2009 in connection with U.S. Appl. No. 11/717,594.

Office Action dated Feb. 20, 2009 in connection with U.S. Appl. No. 11/656,908.

Office Action dated Feb. 23, 2009 in connection with U.S. Appl. No. 11/977,099.

Office Action dated Oct. 30, 2009 in connection with U.S. Appl. No. 11/717,594.

Office Action dated Sep. 1, 2009 in connection with U.S. Appl. No. 11/977,099.

Office Action dated Jul. 14, 2009 in connection with U.S. Appl. No. 11/717,594.

Office Action dated Sep. 4, 2009 in connection with U.S. Appl. No. 11/656,908.

Office Action dated Mar. 22, 2010 in connection with U.S. Appl. No. 11/977,099.

Office Action dated May 13, 2010 in connection with U.S. Appl. No. 11/717,594.

Office Action dated Mar. 4, 2010 in connection with U.S. Appl. No. 11/656,908.

* cited by examiner

METHOD AND SYSTEM FOR ACCOMPLISHING PRODUCT DETECTION

CROSS REFERENCE TO RELATED APPLICATIONS

This application is a continuation of prior U.S. patent application Ser. No. 11/977,099 filed on Oct. 23, 2007 which is a divisional of prior U.S. patent application Ser. No. 10/173,795 filed on Jun. 18, 2002, now U.S. Pat. No. 7,286,901, which is a CIP of U.S. patent application Ser. No. 09/935,935 filed on Aug. 23, 2001, now U.S. Pat. No. 6,732,014, which claims benefit of U.S. Provisional Patent Application No. 60/271,998 filed on Feb. 27, 2001.

BACKGROUND OF THE INVENTION

1. Technical Field

The present invention relates to the vending arts generally and more specifically to vending machine delivery systems for determining whether a product has actually been delivered to the consumer after a customer order.

2. Background

Currently, vending machines lack the ability to detect and confirm whether an ordered product has been actually delivered to a customer after an ordered vend event by the customer has occurred. Present methods referred herein as the home switch method, always assume that the ordered product is available for delivery and that the product is successfully delivered upon completing one vend cycle.

However, vending machines often fail to deliver the product after the vend cycle for various reasons, including improper installation of the products by the vendor's sales representative or obstructions in the delivery path. Thus, presently, after paying for the product and a vend cycle occurring, the customer fails to receive the ordered product, resulting in the customer becoming frustrated with the vending company, affecting customer relations and vending sales.

BRIEF SUMMARY OF THE INVENTION

A vending system that verifies the delivery of a ordered product using a product delivery system that sends a product from a first storage position through a delivery path to a second receiving position, a sensing system located along the delivery path that senses when the product passes a sensor during the product transition through the delivery path from the first position to the second position, and a reporting circuitry electronically coupled to the sensing circuitry wherein the reporting circuitry reports to the product delivery system when the product has passed through the sensing system.

Additionally, a vending machine method is provided for determining whether a product is delivered, the method comprising the steps of sending a delivery signal based on a customer ordering event to a product delivery system, monitoring a delivery path that the product travels to reach a product receiving location, and determining if the product was delivered to the receiving space.

Another aspect of the invention may be found in a method for selectively attempting delivery. If a first attempt to deliver a product fails, the delivery mechanism may gradually proceed or move until the product is delivered. This method may be useful for delivery mechanisms with a home position. If a delivery is detected under normal operation, the delivery mechanism moves from home position back to home position. However, if a delivery is not detected, the delivery mechanism may move from the home position until a delivery is detected or the mechanism returns to the home position.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

DETAILED DESCRIPTION OF THE INVENTION

The present invention is a vending system that verifies that an actual delivery of an ordered product is made. If the actual delivery fails for a set number of delivery attempts, then the customer is offered one or more alternative choices, including without limitation, choosing an alternative product, or a refund.

Figure 1:
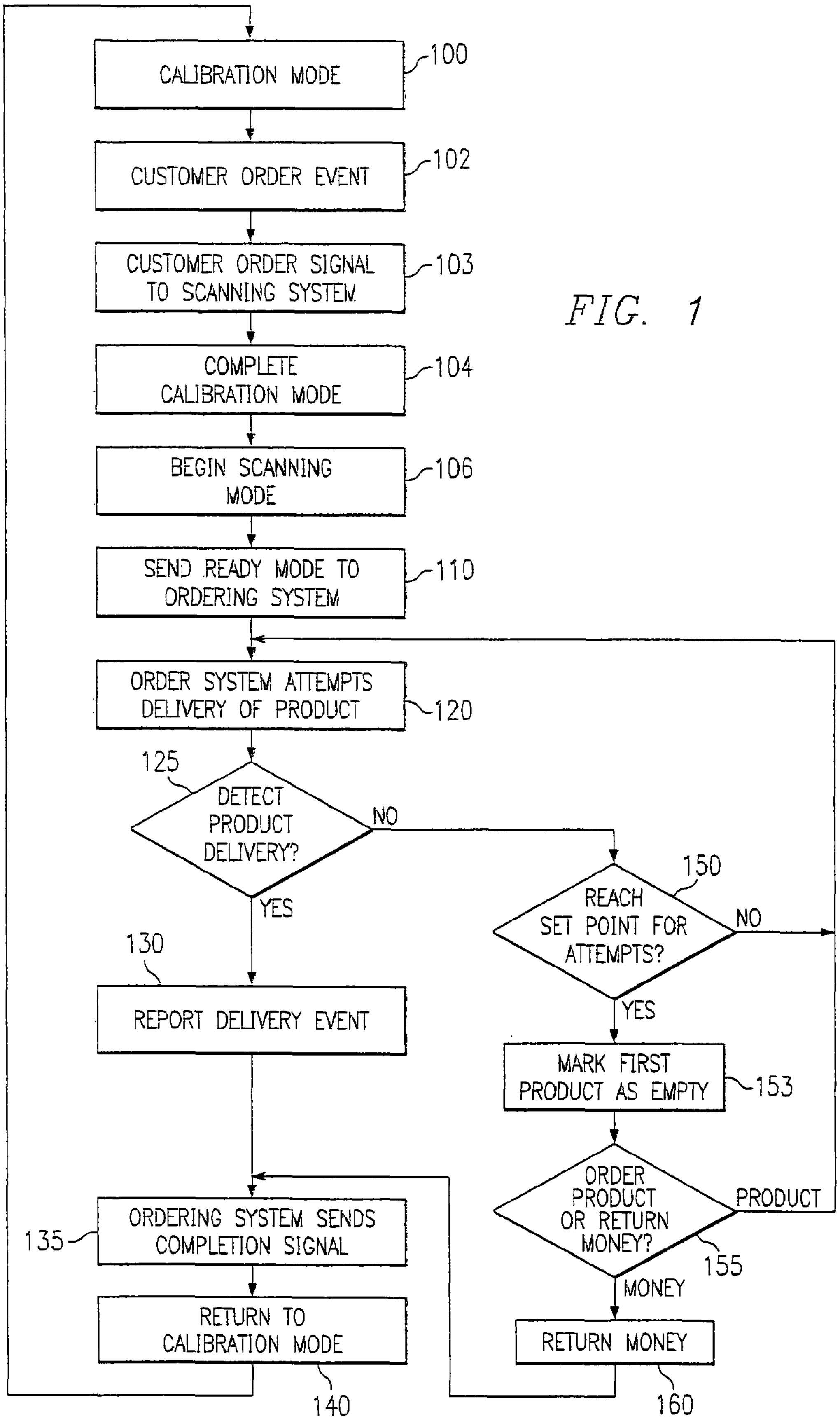
FIG. 1 is an overview of the methodology utilized in the present invention.

FIG. 1 is an overview of the methodology utilized in the present invention. The monitoring system is in calibration mode in its normal steady state configuration mode as shown in step 100. Calibration mode is discussed in greater detail in FIG. 5 below. The customer orders a product after placing money in the ordering system by depressing a keypad or similar device in step 102. The vending machine's ordering system sends a customer order event signal in step 103 to the monitoring system informing the sensing/monitoring system that an order event has occurred in step 102. The monitoring system subsequently completes its last calibration cycle in step 104 and transitions from steady state calibration mode to the monitoring cycle in step 106. Upon transitioning, the monitoring system commences its sensing/monitoring cycle by monitoring the product delivery path and sends a ready signal to the product delivery system in step 110. The monitoring cycle is described in more detail in FIG. 4, herein below. After receiving a ready signal from the monitoring system, the product delivery system attempts to deliver a product through the product delivery path in step 120. If the monitoring system senses or detects the product passing through the delivery path in step 125, it reports the delivery event to the ordering system in step 130. Upon receiving the report, the ordering system concludes the transaction with the customer and sends a completion signal to the monitoring system, which returns to steady state calibration mode in step 135, whereupon the monitoring system enters into calibration mode in step 140.

If the monitoring system does not detect a product in the first delivery attempt in step 125 then it will not send a signal to the ordering system after the step 125. The invention allows the delivery system to attempt delivery three times or a preset option. In step 150, if the number of attempted delivery cycles is less than the preset option, then the ordering system thereupon attempts to deliver the product again in step 120. If the attempted delivery cycles equal the preset option, then in step 155 the customer is granted alternatives to purchasing the first ordered product. Step 155 allows the customer to either ask for a refund or make a selection of a second, different product for delivery and step 153 marks the first ordered product as empty.

Step 153 prevents future vend attempts for the first ordered product until the vending machine is visited by a service person. This helps to prevent cheating of a customer if the vending machine reverts to the home switch operation and helps to prevent further tampering if tampering was the cause of the first vend failure.

If the customer chooses a refund, then the present invention delivers a signal to make a refund, in step 160, whereupon a signal is sent to the monitoring system that the order is complete in step 135 and to the monitoring system to enters into steady state calibration mode in step 140. If the customer choose a second, different product, then the present invention returns to 120 and the process proceeds as described above, until the operation is complete.

Figure 2:
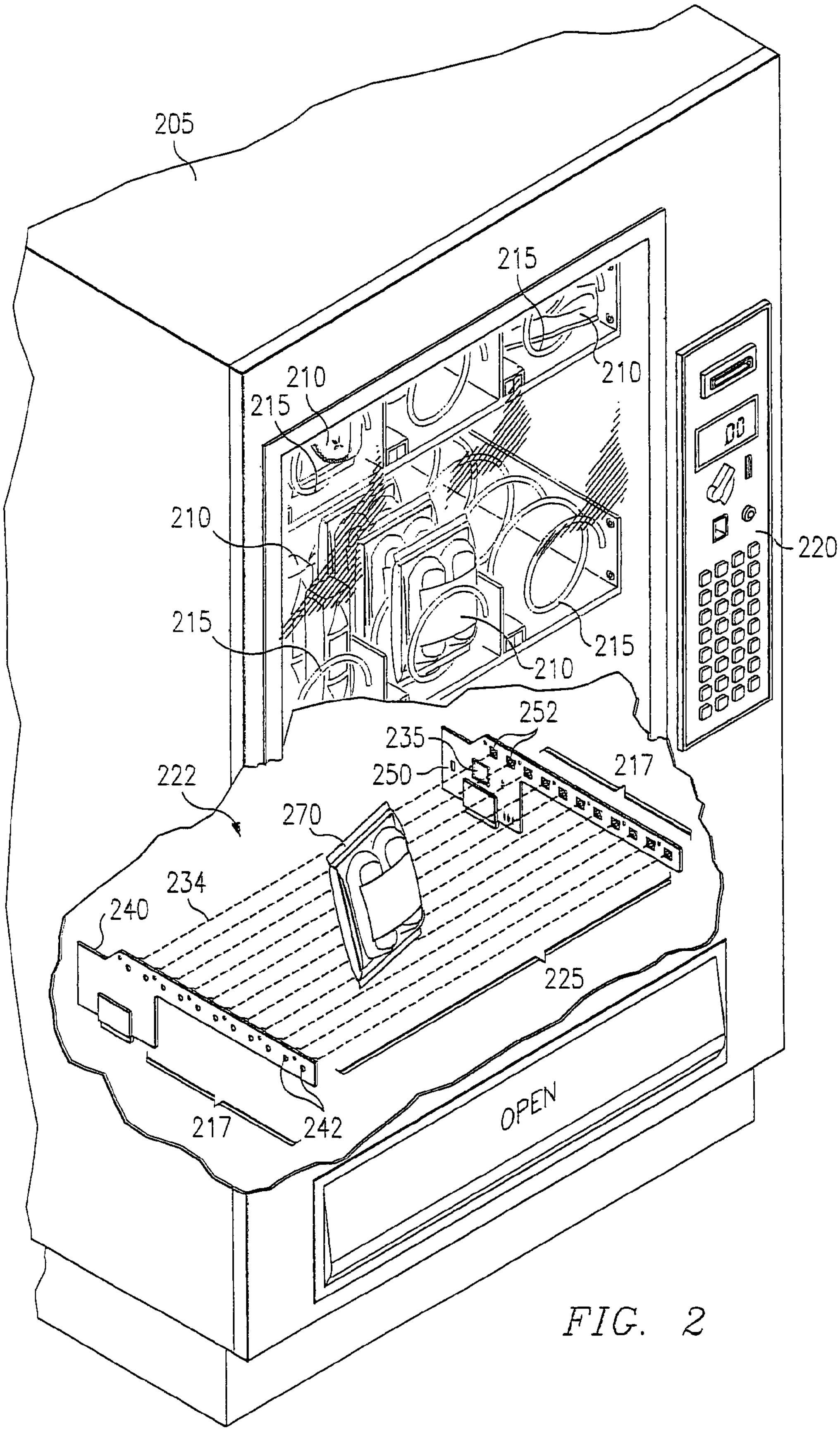
FIG. 2 shows a schematic diagram of the present invention.

FIG. 2 shows a schematic diagram of the present invention installed in a vending machine 205. In FIG. 2 various products 210 are placed in the vending machine's delivery system 215. Prior to a customer making a purchase, the monitoring system 217 is in calibration mode. When a customer makes an order through the order system 220, the monitoring system completes the calibration mode and enters into its monitoring mode. Thereupon, the ordering system allows for an attempted delivery of the ordered product 210, typically through a helical delivery system 215. When ordered, product 270 is delivered into delivery space 222, falling through the delivery path 225 past monitoring system 217. As it passes the monitoring system, the product momentarily breaks the continuity of the monitoring system's monitoring devices. If the monitoring system utilizes an optical monitoring system, then as the product passes through the monitoring system's light plane 234, be it infrared or otherwise, it momentarily breaks the light continuity and prevents a portion of the light from reaching at least one detector on the opposite side of the monitoring path. The logic circuit on the detecting arm 235 will note the momentary blockage of light and report it as a delivery event.

The monitoring system is comprised of an emitter arm 240 upon which are located a set number of one or more emitters 242, and a detector arm 250 comprising of one or more detectors 252 and located directly across delivery path 225 from the emitter arm 240. Emitter signals, the total of which comprise light plane 234 are sent from the emitters 242 to the detectors 252 across the delivery path 225, during both monitoring mode and calibration mode. Furthermore, the emitter arm 240 and the detector arm 250 may be located in various positions. For example, the arms may be in a position that mirrors the one shown, among others. The emitter arms and detector arms are described in more detail in FIGS. 3A, and 3B.

Figure 3A:
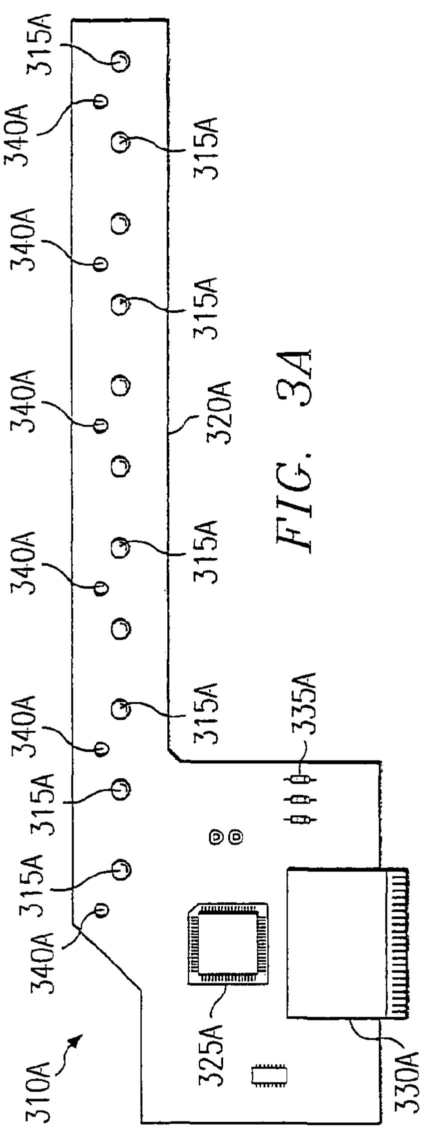
FIG. 3A shows the emitter arm portion of the monitoring system.

FIG. 3A shows the emitter arm portion of the monitoring system. In FIG. 3A, emitting arm 310A transverses along one side of the delivery path in the vending machine. Emitters, 315A, are attached to arm 310A. The horizontal and vertical placement of emitters 315A on arm 310A is determined by the size of the smallest product that crosses the delivery path, and by the tripe and accuracy of the emitters utilized in the present invention.

The emitters may comprise of an optical monitoring device. The spacing of optical emitters is determined by five factors: emitter size, optical diffusion, ambient light, product size and the reflected light. Emitter size and optical diffusion is fixed at the time of construction, however, ambient and reflective light may vary over the course of use of the emitter. Infrared light may be used to help to reduce these effects. However, it is clearly understood and contemplated by the present invention that other types of light sources can be used, including various lasers or white light sources.

The body 320A of the arm 310A is made of suitable material able to contain the electronic control components 325A necessary to operate the emitter, including, a power source 330A, and logic circuitry 335A. Additionally, holes 340A are provided to securely fasten and adjust the positioning of the arm 310A to the vending machine.

Figure 3B:
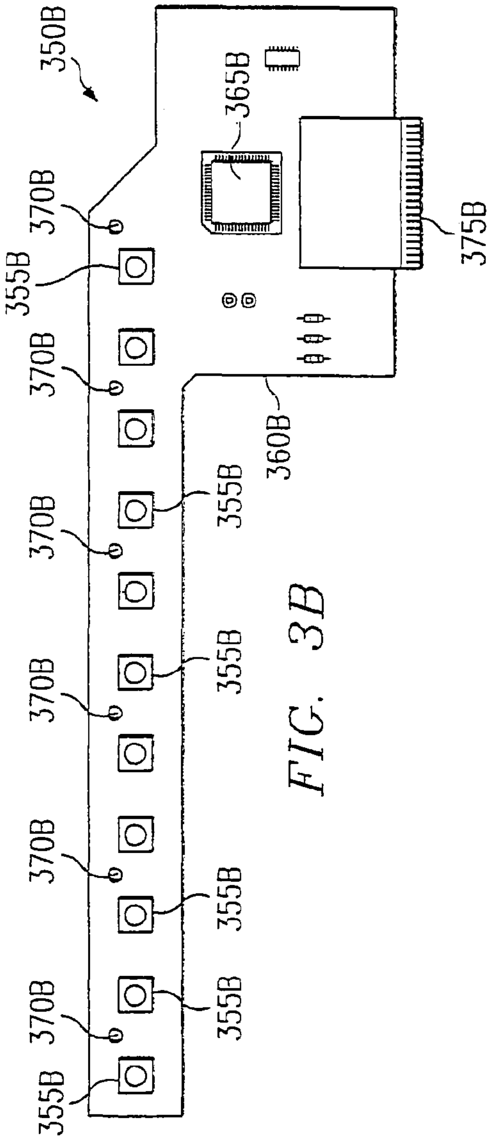
FIG. 3B shows the detector arm portion of the monitoring system.

FIG. 3B shows the detector arm portion of the monitoring system. The shape and construction of the detecting arm 350B is related to the shape and construction of the emitting arm 310A. The detecting arm 350B is placed on the same plane, parallel to and across the delivery path from arm 310A (see FIG. 2 for more details). The detectors 355B are arranged so that their vertical spacing and horizontal arrangement mirror the emitter's arrangement on arm 310A. Likewise, the body 360B of 350B is constructed of material suitable to contain detection and logic circuitry 365B, attachment holes 370B, and a power source 375B. The choice of the type of detector is directly related to the type of emitter being utilized in the present invention.

However, the emitting arm 310A and the detector arm 350B may or may not have power sources, electronic control components, and logic circuitry. In one exemplary embodiment, the detector arm may have a power source, electronic component, and logic circuitry that connects to the emitters thereby eliminating the power source and logic circuitry on the emitter arm. Similarly, the emitter arm may have the power source, electronic components, and logic circuitry and the detector arm not. Further, the power sources. electronic control components, and logic circuitries may be located separately from, together with, or in various combinations with the arms.

Figure 4:
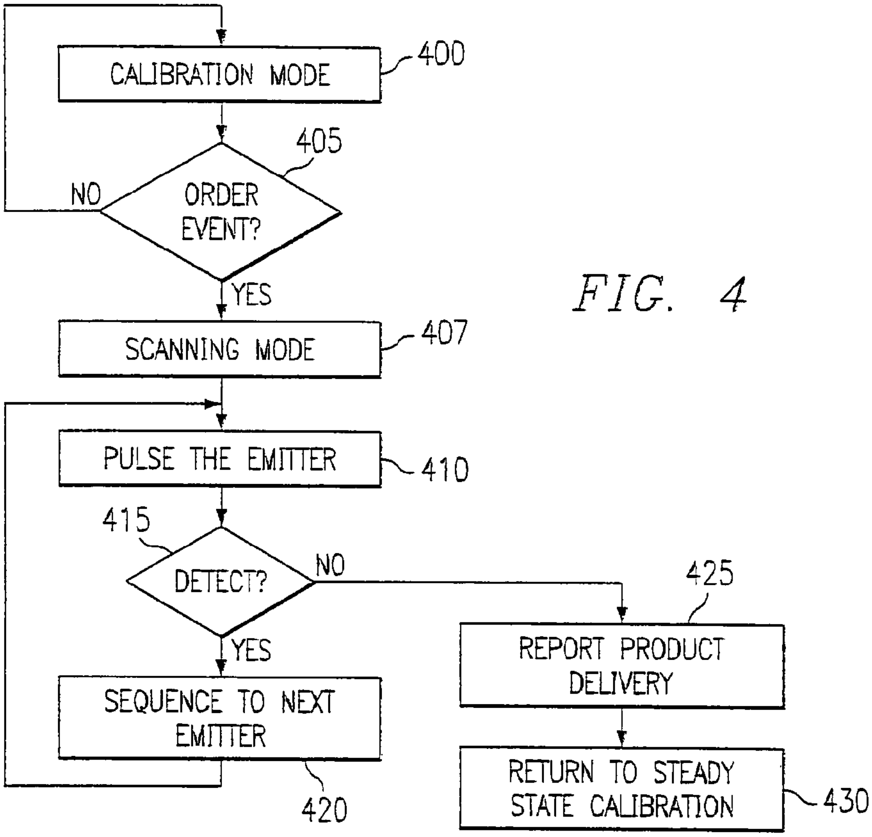
FIG. 4 shows the operation of the monitoring system when a customer places an order.

FIG. 4 shows the operation of the monitoring system when a customer places an order. Prior to placing an order, the monitoring system is in calibration mode in step 400. Upon placement of the order in step 405, the monitoring system transitions from its steady state calibration mode 400 into its monitoring mode in step 407. Once in monitoring mode, the monitoring system begins cycling each emitter by pulsing the emitter individually in step 410. The monitoring system uses a pulse strength determined when the system was in the calibration mode.

In step 410 an emitter pulses its signal to the corresponding detector across from the emitter, and the two detectors on either side of the detector. Upon pulsing the light, the detector circuitry determines whether the detectors detected the light from the emitter in step 415. (If the emitter is either the first emitter or the last emitter on the emitter arm, then only the detector across from the emitter and the detector on the non-wall side of the detector is scanned.)

If the detector directly across from the pulsing emitter or the side detectors detects the signal in 415, then the emitter's logic circuit sequences to the next emitter in line and sends a pulse from that emitter in step 420. The emitter's logic circuit continues until it completes the pulsing of the last detector whereupon, the monitoring system repeats the process, and begins again at the first emitter until the detector's logic circuit receives a detect signal and/or the monitoring system receives a signal to cease monitoring.

If at least one of the three detectors fails to detect a light beam from the emitter during the monitoring cycle, then the logic circuit reports a product delivery to the ordering system in step 425. Once a report of delivered is made to the ordering system, the ordering system returns a signal to the monitoring system to return to steady state calibration mode in step 430. Otherwise, the monitoring system continues to monitor until it receives a return to steady state calibration signal from the ordering system.

Figure 5:
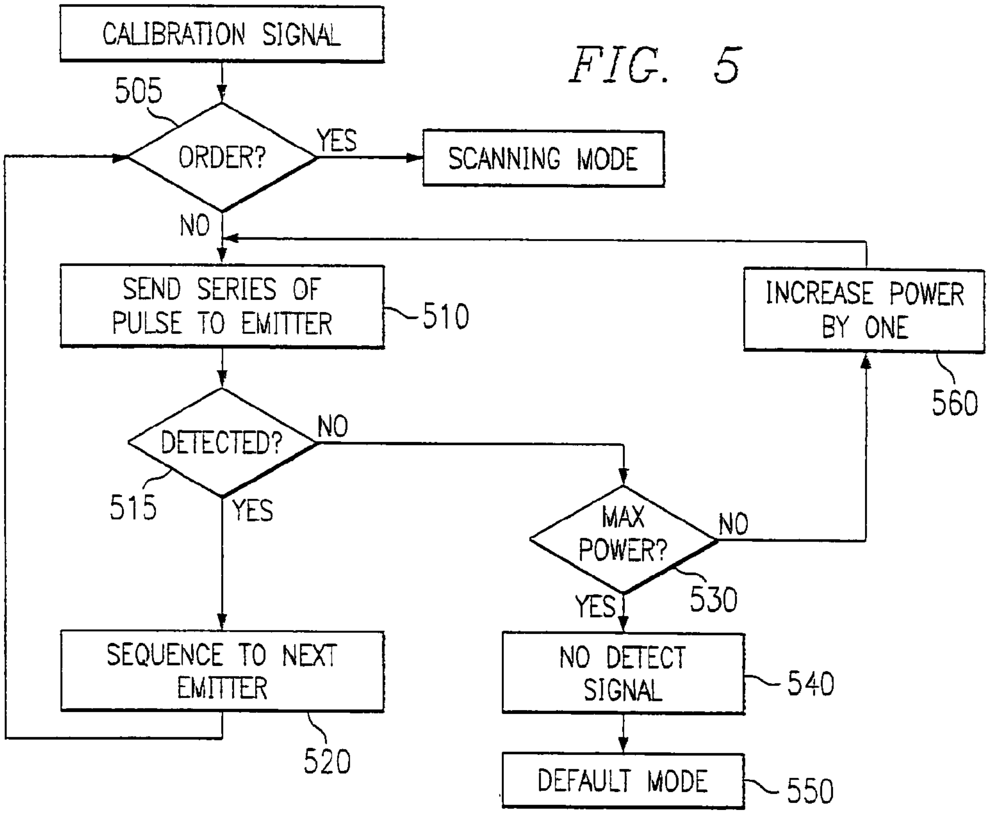
FIG. 5 shows the steady state calibration mode of the monitoring system.

FIG. 5 shows the steady state calibration mode of the monitoring system. During the steady state calibration mode, the monitoring system is constantly calibrating itself for optimum performance because temperature, humidity, dust, and alignment conditions fluctuate over the course of system usage.

The calibration mode adjusts the light intensity from each emitter as necessary so that each set of three detectors serviced by that emitter receives only enough intensity, plus a small safety margin, to be active in the unblocked condition. This minimizes the adverse affects of reflected light from the emitters and allows for a wider detector aperture (which makes system alignment easier) and reduces the overall power requirements of the system. In step 505, the logic circuit in the monitoring system determines whether an order has been placed. If an order has not been placed, then the monitoring system proceeds to send a series of pulses to the first of the one or more emitters in step 510. Upon sending a pulse, the monitoring system queries the emitter's corresponding detector and each detector on either side of the corresponding detector to determine if those detectors detected the pulsed signal in step 515. If a signal was detected in each of the three detectors then the monitoring circuitry sequences to the next emitter in step 520. The emitter's typically have adjustable signal power levels associated with the type of emitter used. The calibration mode will attempt to maintain the power level at the level needed to provide just enough signal, plus a safety margin, such that the corresponding detectors detect the signal. If any one of the three detectors does not detect the pulsed signal from the emitter, then in step 530, the monitoring circuitry determines whether the emitter is operating at its maximum power intensity. If the emitter is not, then the emitter will step increase the signal power level in step 560 and re-send a pulsed signal to the detectors again in step 510. If the power intensity for that emitter is at its maximum intensity, then the detector will send an error message to the monitoring system in step 540. The monitoring system will then follow a pre-coded routine to shut down the entire vending operation, shut down the monitoring system or rely on prior art ordering systems (the home switch method) in step 550.

Figure 6:
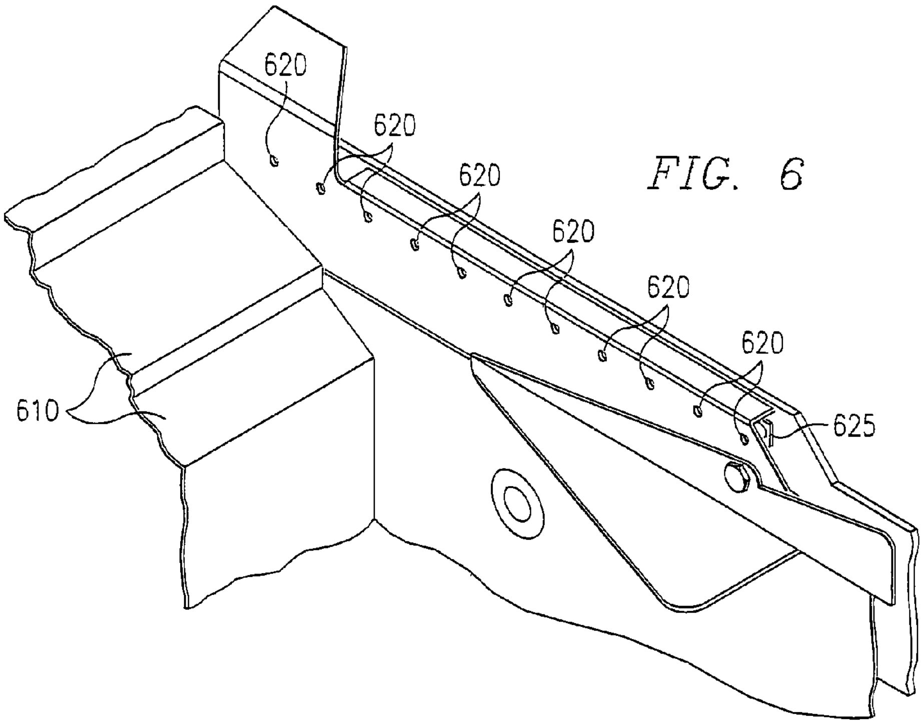
FIG. 6 shows a typical detector arm attached to a vending machine.

FIG. 6 shows a typical detector arm attached to a vending machine. Because of the reflective surfaces 610 in the vending machine, small apertures 620 are used to minimize the reflective light from adjacently reflective surfaces 610. The apertures are narrowed holes located in front of the detectors, 625, on the detector side of sensing system. The holes inhibit unwanted reflections from adjacent surfaces by blocking much of the light beams that reflect back to the detector arm at wider angles than the apertures allow.

Apertures 620 keep the majority of the unwanted light from reaching the detection side of the monitoring system. In addition, the detectors have a usable 60-degree horizontal/30 degree vertical reception angle. Light arriving at the detector at angles greater than these is rejected. Additionally, infrared optical detectors contain optical frequency filters, which reject visible light frequencies, but pass the infrared frequencies of interest. Modulation techniques, whereby the detector only responds to certain signal frequencies from the infrared emitters may also be used to allow the detectors to distinguish between the ambient light and the desired point source light frequency from the emitter.

As mentioned above, product detection may be accomplished by utilizing infrared emitter/detector pairs that can monitor and detect when a signal path is broken. In typical a vending machine's delivery paths, a set of ten infrared emitter/detector pairs are used to cover the delivery path much like a light curtain.

Figure 7:
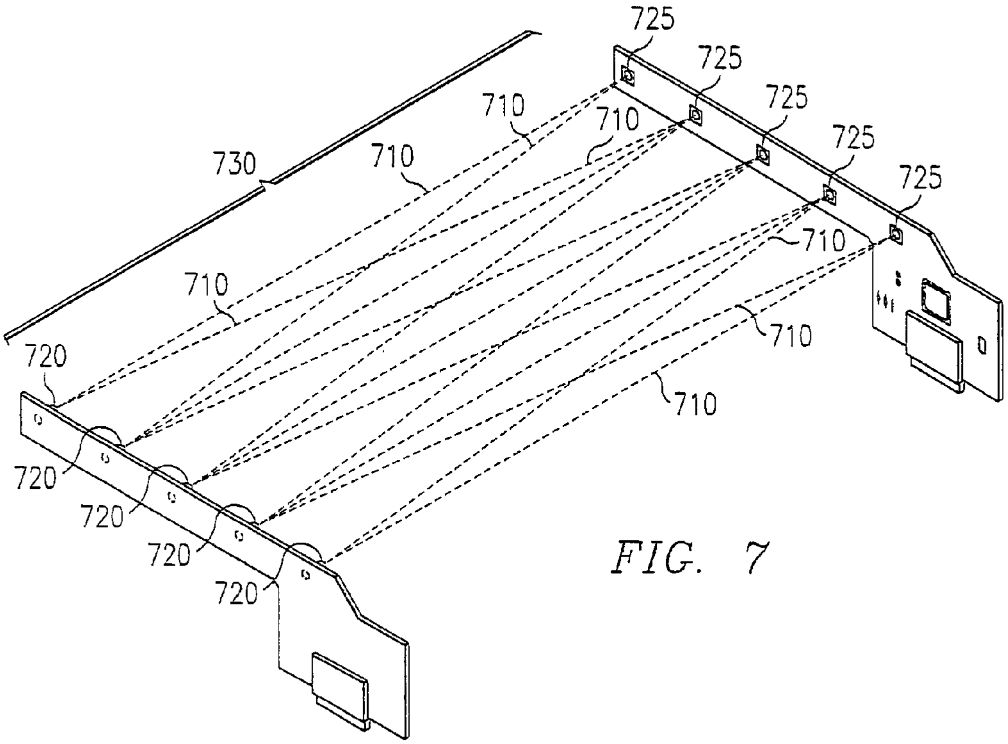
FIG. 7 shows light beam patterns for the emitters in the monitoring system.

FIG. 7 shows a representative example of a light curtain 730 that may be utilized in the present invention. Typically, nine sets of emitters/detectors are used to cover the main delivery path, while the tenth set is used to cover a gum/mint area. The nine sets that cover the main delivery path implement a technique, which other than for the first and last emitter, requires that, a minimum of three detectors are active for each individual emitter monitor cycle. For those vending machines without a gum or mint section, the tenth emitter may be used for the main delivery area, provided that proper alignment of the ten sets is taken into consideration.

This arrangement is illustrated in FIG. 7, which shows the light beams 710 of interest for each emitter 720 and detector 725. The spacing of the emitter/detector sets are chosen to assure that the smallest size traditional product breaks the path of at least one beam when it crosses the light curtain during delivery. The technique of servicing three detectors for each emitter, allows the monitor to read multiple light beams, which further reduces this spacing in the majority of the delivery area. A logic circuit determines whether a light beam has been broken.

In the monitoring system, the infrared emitter/detector sets are controlled by a micro-controller located on the detector arm. During the monitoring mode, it is necessary to monitor each of the emitter/detector sets separately because of the potential for light bleed-over from adjacent emitters. The timing sequence for each set monitor cycle used during the monitoring mode must be fast enough to ensure that the smallest product will be detected by any one of the detectors when the product passes the monitor plane as it falls from the product storage area.

The control software may further provide the vending operator options to revert to home switch operation, to use a delivery method other than home switch operation, or to place the vending machine out of service in the event the monitoring system is inoperative. For example, the operator may chose to revert to go out-of service and prevent erred delivery of the ordered product, all product, or some combination of products. In this manner, theft may be prevented. Alternately, the customer may be offered a refund or the option of selecting another product.

Another option may provide for the machine to return to home switch operation. If the monitoring system malfunctions, returning to home switch operation may permit continued service by the machine.

A further option may provide for the machine to operate in a manner other than home switch operation. For example, upon a first delivery failure, the machine may move from a home position until a product is delivered and stop.

Figure 8:
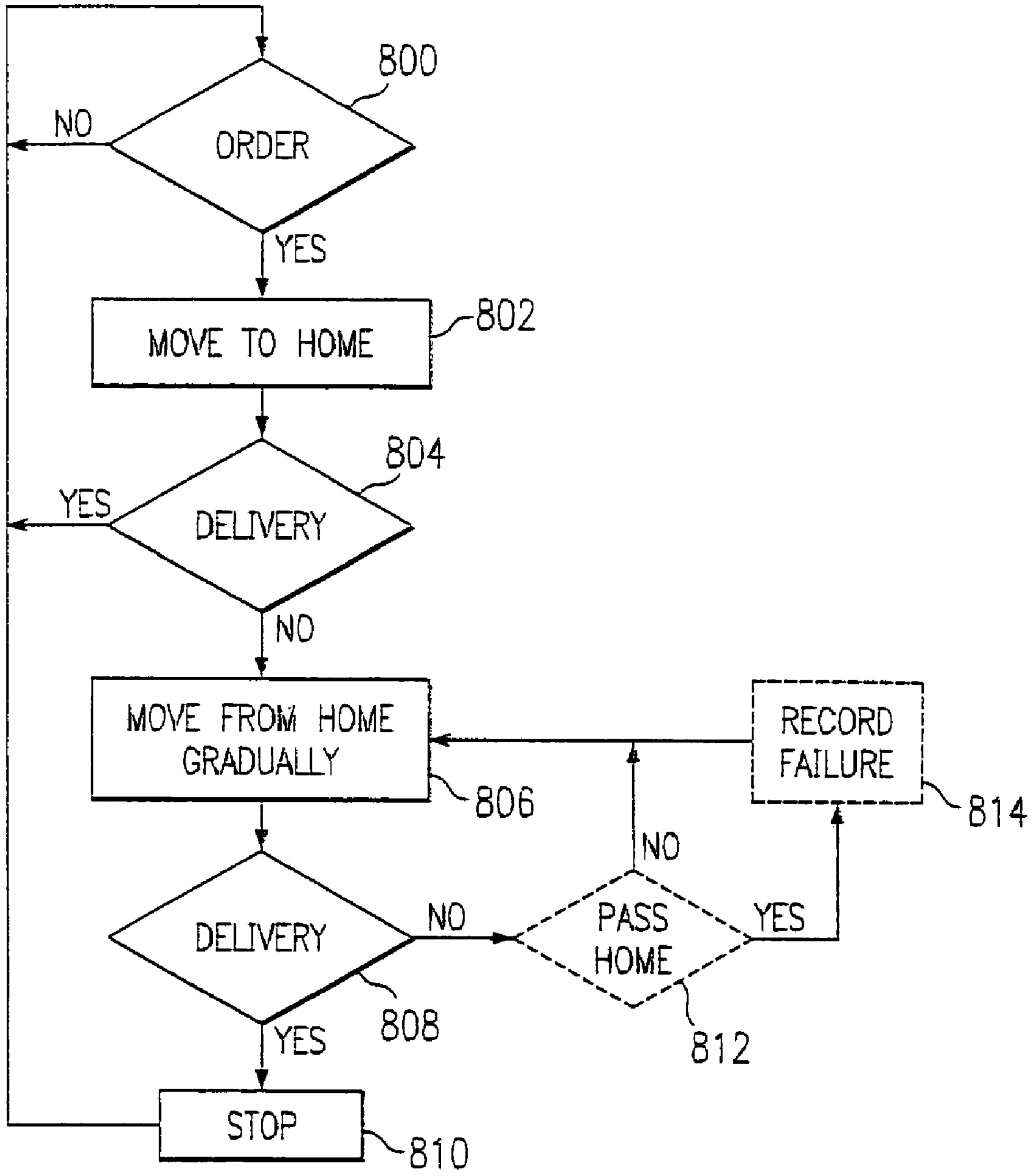
FIG. 8 shows an exemplary feedback method for delivering a product.

FIG. 8 depicts an exemplary embodiment of a method other than home switch operation. In this exemplary method, the machine may wait for an order (block 800). As seen in a block 802, once the order is detected, the delivery mechanism may move to the home position. In normal operation, the machine may rest at a home position, moving from the home position and returning to the home position. For example, in a helical delivery mechanism seen in FIG. 2, product may typically be delivered with each turn of the helix. In this example, the helix rests at a home position and turns one revolution to deliver the product, returning to the home position.

If a deliver is detected, as seen in block 804, the machine returns to waiting for another order. However, if a delivery is not detected, the machine may gradually or at a continuous speed move from the home position (block 806) until a delivery is detected or the delivery mechanism returns to the home position. As seen in the blocks 808 and 810, if a delivery is detected while the delivery mechanism is moving, the mechanism is stopped and the machine awaits another order. If another order is made, the machine returns to the home position. In this manner, if a first item is stuck, a second item may move it forward causing a delivery. By stopping the mechanism, delivery of the second item may be prevented.

However, if a delivery is not detected and the machine returns to home position (block 812), an error or delivery failure may be detected as seen in a block 814. Alternately, the machine may count the number of passes through the home position and disable delivery of the product, all products, and/or offer a refund or credit once a preset number of passes is exceeded.

Further, various other methods may be envisaged which use the monitoring system to ensure delivery of the product and/or prevent theft.

The monitoring system controller printed circuit board uses flash memory to store the firmware. This gives the option to perform firmware updates in the field.

The vending system may have several operating options. In one exemplary embodiment, These may be viewed and programmed by pressing the PRODUCT CONFIG service key on the keypad located on the inside of the vending machine and pressing the down arrow until the appropriate option is reached. The keypad has an associated display device, such as an led screen or such other typical devices that allow the operator to view the code and results stored within the system.

In this exemplary embodiment, by depressing the EDIT keys the vendor can choose between "SURE.V ON" or "SURE.V OFF". "SURE.V OFF" is chosen by the operator only if the monitoring system is not installed or if the operator does not wish it to use it at the present time. The remaining options for the PRODUCT CONFIG mode are only visible if "SURE.V ON" is selected and the monitoring system is available.

When "SURE.V ON" is selected, the operator may then choose between "OPT'N SURE.V" or "MUST SURE.V". If "OPT'N SURE.V" is selected, the vending machine operation reverts to home switch operation if the monitoring system is not operating normally because, for example, of an obstruction or loss of communication. If "MUST SURE.V" is selected by the operator, the vending machine operates only if the monitoring system is available for use for the main delivery area. (The gum and mint area does not affect operation of the main area, unless the programmer decides otherwise.) Otherwise, the vending machine becomes temporarily out-of-service until the blockage or other error is corrected.

When the operator uses the number keys to program "ANTI.JP xx", the anti-jackpot protection option against unforeseeable cheating of the vending machine's monitoring system is activated. "xx" represents the number of empty conditions that disables the entire delivery system for a time period as programmed and decided by the operator (described below). A empty condition occurs when product delivery is not detected and the customer's money is restored or retuned An "xx" value of "00" disables this anti-jackpot feature.

The assumption of this option is that very few system failures to the vending machine's delivery system occurs. If a significant number of failures, represented by "xx", do occur then it is assumed that it is because of tampering. Upon reading "xx", the delivery system is deactivated for a certain amount of time so that money can no longer be refunded because of a vend failure and to discourage a potential thief from attempting to steal either product or money.

In this condition, the vending machine either reverts to home switch operation if "OPT'N SURE.V" is active, or the system deactivates and the vending machine goes out of service if "MUST SURE.V" is active. If in "Must Sure.V", once the programmed deactivation time has elapsed the system is re-enabled and the count towards "xx" is restarted. The total number of system empty selections, the number of anti jackpot occurrences, and the date and time of the last occurrence are recorded as noted below.

The operator programs the number of minutes that the vending system remains disabled because of an anti-jackpot occurrence by selecting the "AJP.TMR xxM" option where "xx" is the time in minutes. If "99" is programed, then the system remains disabled until the main door closes at the end of the next service call. Closing the main door also resets any anti-jackpot time remaining.

Certain system data can be reviewed in the PRODUCT CONFIG mode:

"SV.EMPTY xx" returns the number of times that credit was restored or returned because the monitoring system failed to detect a product delivery.

"**.SV xxx" returns the total number of corrected vends, viewable by selection. These are the vends, which normally would not have delivered product if the present invention was not active.

"WO.SV xxxx" returns the number of vends, viewable by selection, made while the monitoring system was disabled for some reason.

The MACHINE CONFIG list provides additional options related to the present invention. If the operator selects "FAIL=CASH", the customer's money is automatically returned on any failed vend. If "FAIL=CRDT" is selected, the credit is restored to the vending machine for another selection. The customer may press the coin return to retrieve his money.

The TEST list provides the test screen for the system. If the operator keys in "SV.TST xx", the following options are provided:

"SV.TST OK" indicates that the monitoring system is operating properly.

"SV.TST xx" indicates a block in sensing zone 1-9 with 1 being closest to the glass. "H" indicates the gum & mint is blocked if it is configured. This number is displayed real-time and beeps as it changes. This may be used to test the product coverage of the monitoring system's sensors, although the accuracy is somewhat less than in actual vend situations because of the data being presented.

"SV.TST CAL" indicates calibration values that are high. "EDIT" may be used to view the calibration values. A high calibration may be caused by dirt, misalignment of the system sensors, or a partial blockage of a sensor.

A calibration value of "0" indicates a shorted detector. This normally requires a new detector assembly.

A calibration value of "1" indicates that zone could not be calibrated. It indicates a blocked or damaged sensor.

Calibration values above "A" are abnormal and may require adjustment of the alignment or cleaning of the sensors.

"SV.TST COMM" indicates loss of communication with the monitoring system, and allows the operation to check the harness connections between the vending machine controller and the monitoring system's controller.

Diagnostics related to the present invention:

"SV.EMPTY nn" shows that selection "nn" was marked as empty because product delivery was not detected.

"SV.TST xx" automatically enters the system test screen as a diagnostic message if any blocked sensor, communication error, or calibration error is detected.

"AJP.TMR xx.xM" is in the diagnostic list if the anti-jackpot timer is active. It shows the time remaining.

"AJP xxX MN/DY HR.MN" is the total number of times the anti-jackpot feature occurred plus the date and time of the last occurrence.

However, other options and coding methods may be envisages. In addition, other functionality will become apparent in light of this description.

As such, a system and method for ensuring delivery of product and preventing theft is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. An apparatus for facilitating delivery of a product from a vending machine, the vending machine having an ordering system for accepting a customer order of the product, at least one delivery mechanism associated with the product and a delivery path for delivering the product, the delivery mechanism moving from and returning to a home position in response to the customer order, the apparatus comprising:

a monitoring system located about the delivery path, the monitoring system determining if a product passes along the delivery path; and a circuitry communicatively coupled to the monitoring system, the circuitry determining a failure if the product does not pass along the delivery path in response to the delivery mechanism moving from and returning to a home position, the circuitry instructing the at least one delivery mechanism to move from the home position in response to the failure and to subsequently stop in response to the product passing along the delivery path.

2. The apparatus of claim 1, wherein the monitoring system alternates between a steady state calibration mode and a monitoring mode.

3. The apparatus of claim 2, wherein the monitoring system switches from the steady state calibration mode to the monitoring mode on the detection of the customer order.

4. The apparatus of claim 2, wherein the monitoring system switches from the monitoring mode to the steady state calibration mode on the detection of a delivery completion signal.

5. The apparatus of claim 3, wherein the monitoring mode allows multiple delivery attempts of the product.

6. The apparatus of claim 5, wherein the number of delivery attempts is a predetermined number.

7. The apparatus of claim 6, wherein a customer is permitted to select a second product after the predetermined number of delivery attempts.

8. The apparatus of claim 6, wherein a customer is permitted to receive a refund after the predetermined number of delivery attempts.

9. The apparatus of claim 6, wherein the monitoring system, after the predetermined number of delivery attempts, prevents a future vend attempt of the product until the vending machine is serviced.

10. The apparatus of claim 1, the monitoring system comprising:

a row of emitters disposed on a emitter arm, and a row of detectors disposed on a detector arm, wherein a horizontal and vertical spacing between the emitters is determined by a size of a smallest product that crosses the delivery path.

11. The apparatus of claim 10, wherein the horizontal and vertical spacing between the emitters is further determined by at least one of: emitter size, optical diffusion, ambient light, product size and reflected light.

12. The apparatus of claim 10, wherein the emitter arm comprises a power source and a logic circuitry.

13. The apparatus of claim 10, wherein the detector arm comprises a power source and a logic circuitry.

14. The apparatus of claim 10, wherein a power source and a logic circuitry for the emitters and the detectors is disposed apart from the emitter arm and the detector arm.

15. The apparatus of claim 10, wherein a light intensity of each emitter is determined by a calibration mode.

16. A vending machine, comprising:

a plurality of helical coil dispensing mechanisms each selectively dispensing one of one or more products contained therein;

a customer input accepting a customer order for a customer-selected product within one of the helical coil dispensing mechanisms, wherein products from each of the helical coil dispensing mechanisms pass through a single monitored region during delivery from the respective helical coil dispensing mechanism to a customer-accessible delivery bin;

a monitoring system selectively determining when products pass through the monitored region;

a controller causing the helical coil dispensing mechanism containing the customer-selected product to begin rotating in response to a signal from the customer input, wherein the monitoring system determines whether the customer-selected product passes through the monitored region while the helical coil dispensing mechanism rotates through a first revolution from a home position back to the home position, and wherein the controller, in response to the monitoring system detecting passage of the customer-selected product through the monitored region during rotation of the helical coil dispensing mechanism through the first revolution, causes the helical coil dispensing mechanism to stop at the home position, and in response to the monitoring system failing to detect passage of the customer-selected product through the monitored region during rotation of the helical coil dispensing mechanism through the first revolution, causes the helical coil dispensing mechanism to continue rotating past the home position.

17. The vending machine according to claim 16, wherein the controller, in response to the monitoring system detecting passage of the customer-selected product through the monitored region during rotation of the helical coil dispensing mechanism through a second revolution immediately following the first revolution, causes the helical coil dispensing mechanism to stop at the home position, and, in response to the monitoring system failing to detect passage of the customer-selected product through the monitored region during rotation of the helical coil dispensing mechanism through the second revolution, causes the helical coil dispensing mechanism to stop at the home position and signals a product delivery failure.

18. The vending machine according to claim 16, wherein the monitored region is located below all of the helical coil dispensing mechanisms and at or above the customer-accessible delivery bin, the vending machine further comprising:

a transparent front through a customer may view products within the helical coil dispensing mechanisms.

19. A vending machine, comprising:

a plurality of helical coil dispensing mechanisms each selectively dispensing one of one or more products contained therein;

a customer input accepting a customer order for a customer-selected product within one of the helical coil dispensing mechanisms, wherein products from each of the helical coil dispensing mechanisms pass through a single monitored region during delivery from the respective helical coil dispensing mechanism to a customer-accessible delivery bin;

a monitoring system selectively determining when products pass through the monitored region;

a controller causing the helical coil dispensing mechanism containing the customer-selected product to begin rotating in response to a signal from the customer input, wherein the monitoring system determines whether the customer-selected product passes through the monitored region while the helical coil dispensing mechanism rotates through a first revolution from a home position back to the home position, and wherein the controller, in response to the monitoring system detecting passage of the customer-selected product through the monitored region during rotation of the helical coil dispensing mechanism through the first revolution, causes the helical coil dispensing mechanism to stop at the home position, and in response to the monitoring system failing to detect passage of the customer-selected product through the monitored region during rotation of the helical coil dispensing mechanism through the first revolution, causes the helical coil dispensing mechanism to continue rotating past the home position until either the monitoring system detects passage of the customer-selected product through the monitored region or the helical coil dispensing mechanism completes a second revolution, whichever occurs first.

20. The vending machine according to claim 19, wherein the controller, in response to the monitoring system failing to detect passage of the customer-selected product through the monitored region during rotation of the helical coil dispensing mechanism through the second revolution, disables the helical coil dispensing mechanism containing the customer-selected product.

* * * * *